(12) United States Patent
Merey

(10) Patent No.: US 12,013,774 B2
(45) Date of Patent: Jun. 18, 2024

(54) VERIFICATION OF CORE FILE DEBUGGING RESOURCES

(71) Applicant: Red Hat, Inc., Raleigh, NC (US)

(72) Inventor: Aaron Merey, Oshawa (CA)

(73) Assignee: Red Hat, Inc., Raleigh, NC (US)

( * ) Notice: Subject to any disclaimer, the term of this patent is extended or adjusted under 35 U.S.C. 154(b) by 84 days.

(21) Appl. No.: 17/877,528

(22) Filed: Jul. 29, 2022

(65) Prior Publication Data

US 2024/0037017 A1 Feb. 1, 2024

(51) Int. Cl.
*G06F 11/36* (2006.01)
*G06F 11/32* (2006.01)

(52) U.S. Cl.
CPC .......... *G06F 11/366* (2013.01); *G06F 11/327* (2013.01); *G06F 11/3624* (2013.01)

(58) Field of Classification Search
None
See application file for complete search history.

(56) References Cited

U.S. PATENT DOCUMENTS

| | | | |
|---|---|---|---|
| 6,681,348 B1* | 1/2004 | Vachon | G06F 11/1415 |
| | | | 714/38.14 |
| 6,795,963 B1 | 9/2004 | Andersen et al. | |
| 6,804,813 B1 | 10/2004 | Willems et al. | |
| 7,401,261 B1* | 7/2008 | Whittaker | G06F 11/324 |
| | | | 714/37 |
| 9,104,796 B2* | 8/2015 | Smith | G06F 11/0721 |
| 9,720,925 B1 | 8/2017 | Lawson | |
| 11,074,154 B2 | 7/2021 | Mitchell et al. | |
| 11,080,164 B2 | 8/2021 | Raviv et al. | |
| 11,256,602 B2 | 2/2022 | Merey et al. | |
| 11,720,474 B2* | 8/2023 | Souders | G06F 11/366 |
| | | | 717/124 |
| 2004/0210872 A1* | 10/2004 | Dorr | G06F 11/3636 |
| | | | 717/124 |
| 2007/0094532 A1* | 4/2007 | Sengupta | G06F 11/3632 |
| | | | 714/E11.207 |
| 2009/0198484 A1* | 8/2009 | Christensen | G06F 11/3668 |
| | | | 703/22 |
| 2009/0307667 A1* | 12/2009 | Booth | G06F 11/366 |
| | | | 717/128 |

(Continued)

FOREIGN PATENT DOCUMENTS

WO 2017211651 A1 12/2017

*Primary Examiner* — Jason D Mitchell
(74) *Attorney, Agent, or Firm* — Womble Bond Dickinson (US) LLP

(57) ABSTRACT

Systems and methods for implementing a verification of core file debugging resources are disclosed. A plurality of mappings are created from a core file comprising a plurality of filenames and a plurality of target build identifiers (IDs). The core file corresponds to a computer program crash event and each one of the plurality of mappings map one of the plurality of filenames to a corresponding one of the plurality of target build IDs. Responsive to creating the plurality of mappings, a first file is located that corresponds to a first filename included in a first mapping from the plurality of mappings. The first comprises a first target build ID. A processing device utilizes the first file to analyze the computer program crash event in response to determining that the first file build ID matches the first target build ID.

17 Claims, 6 Drawing Sheets

(56) References Cited

U.S. PATENT DOCUMENTS

| | | | |
|---|---|---|---|
| 2010/0313185 A1* | 12/2010 | Gupta | G06F 9/455 |
| | | | 717/124 |
| 2014/0359077 A1* | 12/2014 | Chung | G06F 11/362 |
| | | | 709/219 |
| 2015/0261596 A1* | 9/2015 | Muthukumsarasamy | |
| | | | G06F 11/0778 |
| | | | 714/57 |
| 2016/0364317 A1* | 12/2016 | Rehman | G06F 11/3664 |
| 2019/0121717 A1* | 4/2019 | Francis | H04L 69/40 |
| 2020/0241951 A1* | 7/2020 | Koropoff | G06F 40/169 |
| 2020/0301815 A1 | 9/2020 | Mola | |
| 2022/0197777 A1* | 6/2022 | Souders | G06F 11/3628 |

\* cited by examiner

400 ⇘

```
┌─────────────────────────────────────────────────────────────┐
│  Creating a plurality of mappings from a core file comprising a plurality of │
│  filenames and a plurality of target build identifiers (IDs), wherein the core file │
│  corresponds to a computer program crash event and each one of the plurality of │
│  mappings map one of the plurality of filenames to a corresponding one of the │
│              plurality of target build IDs                   │
│                        410                                   │
└─────────────────────────────────────────────────────────────┘
                              │
                              ▼
┌─────────────────────────────────────────────────────────────┐
│  Responsive to creating the plurality of mappings, locating a first file │
│  corresponding to a first filename included in a first mapping from the plurality of │
│  mappings, wherein the first mapping comprises a first target build ID │
│                        420                                   │
└─────────────────────────────────────────────────────────────┘
                              │
                              ▼
┌─────────────────────────────────────────────────────────────┐
│  Utilizing, by a processing device, the first file to analyze the computer program │
│  crash event in response to determining that the first file build ID matches the first │
│                      target build ID                         │
│                           430                                │
└─────────────────────────────────────────────────────────────┘
```

FIG. 4

VERIFICATION OF CORE FILE DEBUGGING RESOURCES

TECHNICAL FIELD

Aspects of the present disclosure relate to program analysis, and more particularly, to utilizing correct versions of files to analyze a computer program crash event.

BACKGROUND

Computer programs typically access other files when executing, such as accessing shared library files. When a computer program crashes, an operating system generates a core file that captures the state of the computer program at the time of the crash. Because computer programs bring in components of the shared files into their memory space when executing, the core file includes information that contain the components of the shared files, which includes build IDs of the shared files. Build IDs are specific identifiers for each file (e.g., shared library file, executable program, etc.), which are assigned at compilation time by the compilation pipeline.

A debugger is a computer program used by programmers to analyze and debug a computer program. When a computer program crashes and the operating system generates the core file, the debugger uses the core file to create a snapshot (e.g., debug environment) that includes the computer program and corresponding shared files.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a flow diagram of a method for utilizing correct versions of files to analyze a computer program crash event.

DETAILED DESCRIPTION

Figure 1:
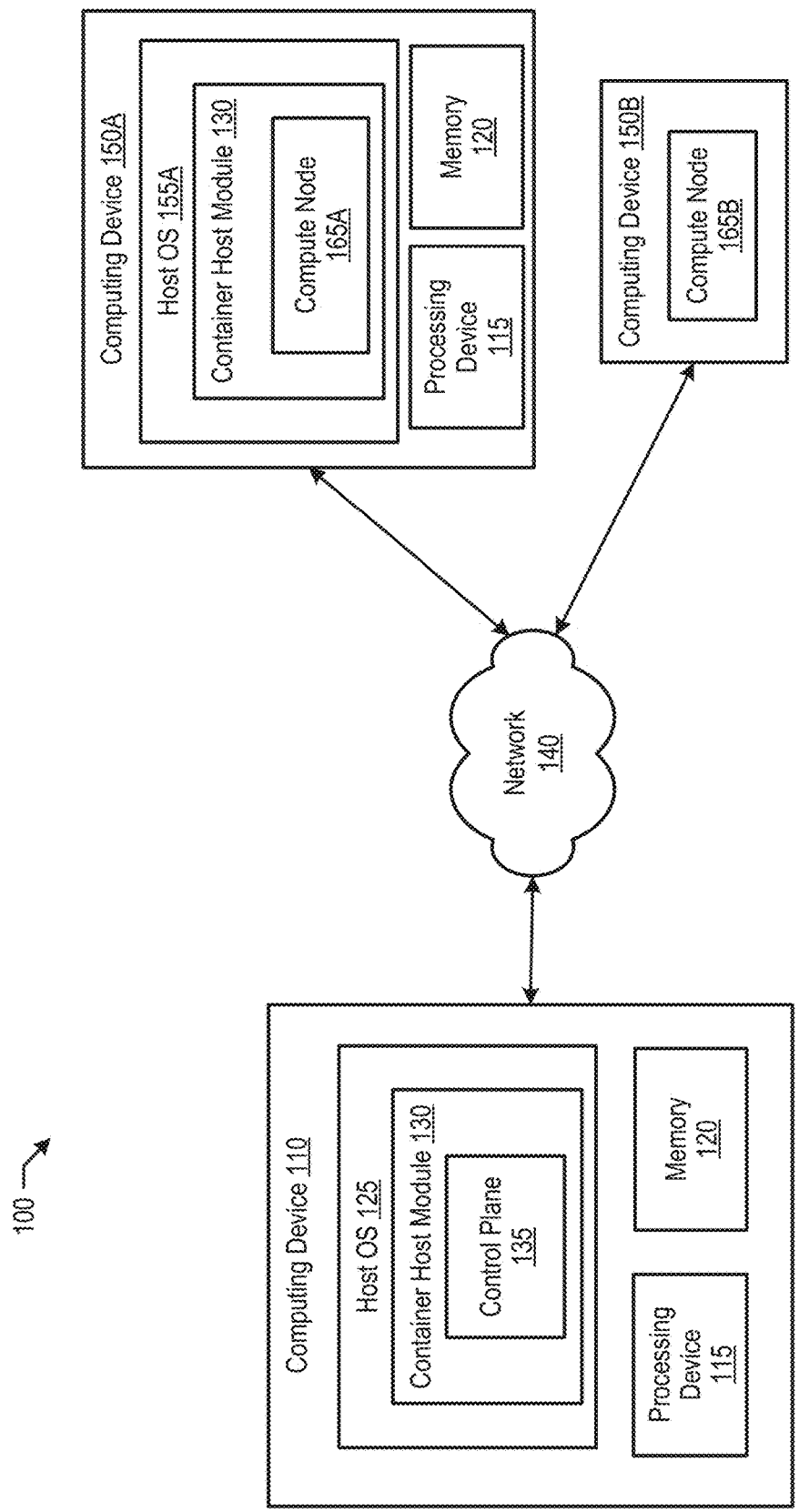
FIG. 1 is a block diagram that illustrates an example system, in accordance with some embodiments of the present disclosure.

For a debugger to accurately analyze a core file (e.g., a core dump), the debugger must utilize the correct versions of the shared libraries and computer program to generate an accurate snapshot of the program at the time of the crash. Prior debugger approaches may use incorrect versions of files and wait until an error is generated to inform the user of an issue.

The present disclosure addresses the above-noted and other deficiencies by using a processing device to create a plurality of mappings from a core file comprising a plurality of filenames and a plurality of target build identifiers (IDs). The the core file corresponds to a computer program crash event and each one of the plurality of mappings map one of the plurality of filenames to a corresponding one of the plurality of target build IDs. Responsive to creating the plurality of mappings, the processing device may locate a first file corresponding to a first filename included in a first mapping from the plurality of mappings, wherein the first mapping comprises a first target build ID. The processing device may utilize the first file to analyze the computer program crash event in response to determining that the first file build ID matches the first target build ID.

In some embodiments, the processing device may build a debug environment responsive to creating the plurality of mappings. The processing device may load the first file into the debug environment responsive to determining that the first file build ID matches the first target build ID. The processing device may debug the computer program crash event using the debug environment.

In some embodiments, the plurality of mappings is a plurality of first mappings and, prior to building the debug environment, the processing device may locate a plurality of files corresponding to the plurality of target build IDs, wherein each file in the plurality of files includes one of a plurality of sonames. The processing device may create a plurality of second mappings, wherein each one of the plurality of second mappings map one of the plurality of sonames to a corresponding one of the plurality of target build IDs.

In some embodiments, during the building of the debug environment, the processing device may locate a second file, from the plurality of files, that corresponds to a first soname in the plurality of sonames. The second file includes a second file build ID. The processing device may select one of the plurality of second mappings that correspond to the first soname, wherein the selected mapping includes a second target build ID. The processing device may load the second file into the debug environment in response to determining that the second file build ID matches the second target build ID.

In some embodiments, the first file is located on a first storage area, and the processing device may invoke a query to locate a second file on a second storage area responsive to the first file build ID not matching the first target build ID. The processing device may, responsive to receiving a query response that locates the second file on the second storage area, retrieve the second file from the second storage area, wherein the second file includes a second file build ID. The processing device may load the second file into the debug environment in response to determining that the second file build ID matches the first target build ID.

In some embodiments, the processing device may, responsive to the second file build ID not matching the first target build ID, transmit a notification message to a user, prior to debugging the computer program crash event, that indicates a correct version corresponding to the target build ID is unavailable.

In some embodiments, the processing device may identify a first section in the core file, wherein the first section comprises a start address and a second filename from the plurality of filenames. The processing device may locate a second section in the core file that begins at the start address, wherein the second section comprises a second target build ID. The processing device may create one of the plurality of mappings that include the second filename and the second target build ID.

FIG. 1 is a block diagram that illustrates an example system 100. As illustrated in FIG. 1, system 100 includes a computing device 110, and a plurality of computing devices 150. The computing devices 110 and 150 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In some embodiments, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 150. Each computing device 110 and 150 may include hardware such as processing device 115 (e.g., processors, central processing units (CPUs)), memory 120 (e.g., random access memory 120 (e.g., RAM)), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. Each computing device may comprise any suitable type of computing device or machine that has a programmable processor including, for example, server computers, desktop computers, laptop computers, tablet computers, smartphones, set-top boxes, etc. In some examples, each of the computing devices 110 and 150 may comprise a single machine or may include multiple interconnected machines (e.g., multiple servers configured in a cluster). The computing devices 110 and 150 may be implemented by a common entity/organization or may be implemented by different entities/organizations. For example, computing device 110 may be operated by a first company/corporation and one or more computing devices 150 may be operated by a second company/corporation. Each of computing device 110 and computing devices 150 may execute or include an operating system (OS) such as host OS 125 and host OS 155 respectively, as discussed in more detail below. The host OS of a computing device 110 and 150 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 150 may each implement a compute node (e.g., as part of the container orchestration engine).

In some embodiments, a container orchestration engine 130 (referred to herein as container host 130), such as the Redhat™ OpenShift™ module, may execute on the host OS 125 of computing device 110 and the host OS 155 of computing device 150, as discussed in further detail herein. The container host module 130 may be a platform for developing and running containerized applications and may allow applications and the data centers that support them to expand from just a few machines and applications to thousands of machines that serve millions of clients. Container host 130 may provide an image-based deployment module for creating containers and may store one or more image files for creating container instances. Many application instances can be running in containers on a single host without visibility into each other's processes, files, network, and so on. Each container may provide a single function (often called a "micro-service") or component of an application, such as a web server or a database, though containers can be used for arbitrary workloads. In this way, the container host 130 provides a function-based architecture of smaller, decoupled units that work together.

When developers develop computer program applications, the developers may be required to debug the computer program applications. To properly configure a debug environment to debug the computer program application, the debug environment must utilize correct versions of files. In one embodiment, computing device 110 employs a debugger to perform the steps discussed herein to verify that the debug environment includes correct versions of files.

Container host 130 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 130 or a registry server. In some embodiments, the image file may include one or more base layers. An image file may be shared by multiple containers. When the container host 130 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each comprise static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

While the container image is the basic unit containers may be deployed from, the basic units that the container host 130 may work with are called pods. A pod may refer to one or more containers deployed together on a single host, and the smallest compute unit that can be defined, deployed, and managed. Each pod is allocated its own internal IP address, and therefore may own its entire port space. Containers within pods may share their local storage and networking. In some embodiments, pods have a lifecycle in which they are defined, they are assigned to run on a node, and they run until their container(s) exit or they are removed based on their policy and exit code. Although a pod may contain more than one container, the pod is the single unit that a user may deploy, scale, and manage. The control plane 135 of the container host 130 may include replication controllers (not shown) that indicate how many pod replicas are required to run at a time and may be used to automatically scale an application to adapt to its current demand.

By their nature, containerized applications are separated from the operating systems where they run and, by extension, their users. The control plane 135 may expose applications to internal and external networks by defining network policies that control communication with containerized applications (e.g., incoming HTTP or HTTPS requests for services inside the cluster 165).

A typical deployment of the container host 130 may include a control plane 135 and a cluster of compute nodes 165, including compute nodes 165A and 165B (also referred to as compute machines). The control plane 135 may include REST APIs which expose objects as well as controllers which read those APIs, apply changes to objects, and report status or write back to objects. The control plane 135 manages workloads on the compute nodes 165 and also executes services that are required to control the compute nodes 165. For example, the control plane 135 may run an API server that validates and configures the data for pods, services, and replication controllers as well as provides a focal point for the cluster 165's shared state. The control plane 135 may also manage the logical aspects of networking and virtual networks. The control plane 135 may further provide a clustered key-value store (not shown) that stores the cluster 165's shared state. The control plane 135 may also monitor the clustered key-value store for changes to objects such as replication, namespace, and service account controller objects, and then enforce the specified state.

The cluster of compute nodes 165 are where the actual workloads requested by users run and are managed. The compute nodes 165 advertise their capacity and a scheduler (not shown), which is part of the control plane 135, determines which compute nodes 165 containers and pods will be started on. Each compute node 165 includes functionality to accept and fulfill requests for running and stopping container workloads, and a service proxy, which manages communication for pods across compute nodes 165. A compute node 165 may be implemented as a virtual server, logical container, or GPU, for example.

Figure 2:
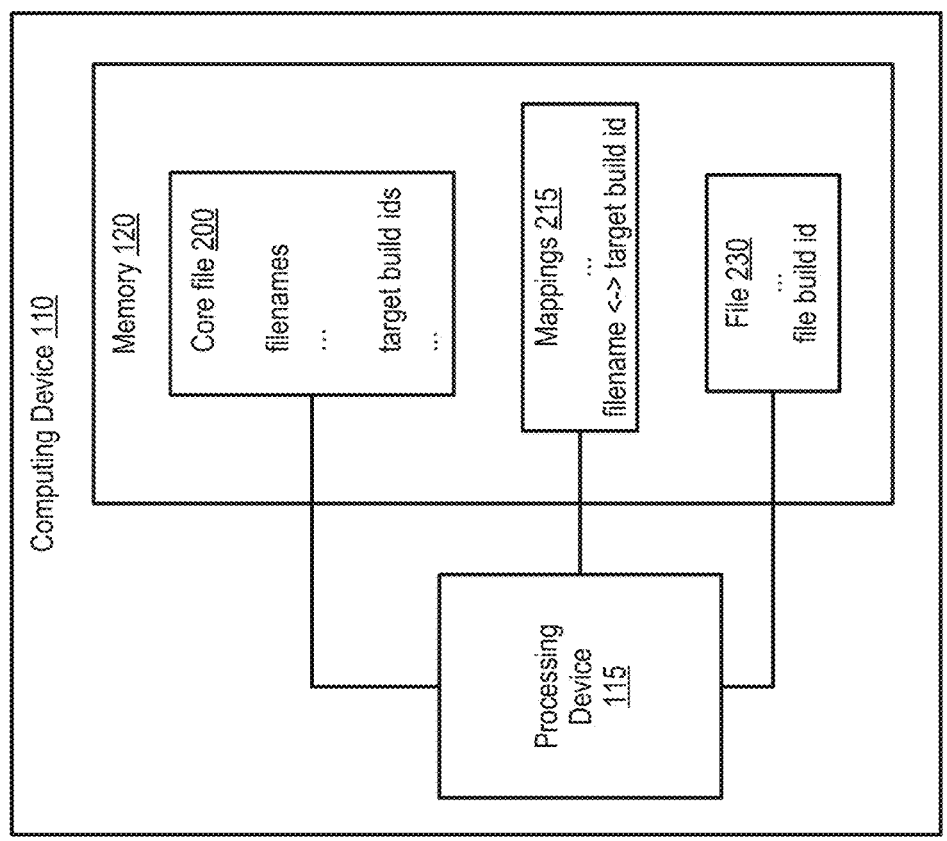
FIG. 2 is a block diagram that illustrates an example system for utilizing correct versions of files to analyze a computer program crash event.

FIG. 2 is a block diagram that illustrates an example system for utilizing correct versions of files to analyze a computer program crash event. When a computer program crashes, the operating system generates core file 200 in memory 120. Processing device 115 executes a debugger as discussed herein to read core file 200 and generate mappings 215, which maps filenames to target build IDs based on information from core file 200. Then, the debugger locates a file corresponding to one of the filenames (file 230), and checks whether file 230's file build ID matches the target build ID in the corresponding mapping in mappings 215. If the build IDs match, the debugger determines that file 230 is the correct version of the file and, in one embodiment, loads file 230 into a debug environment for further analysis.

Figure 3A:
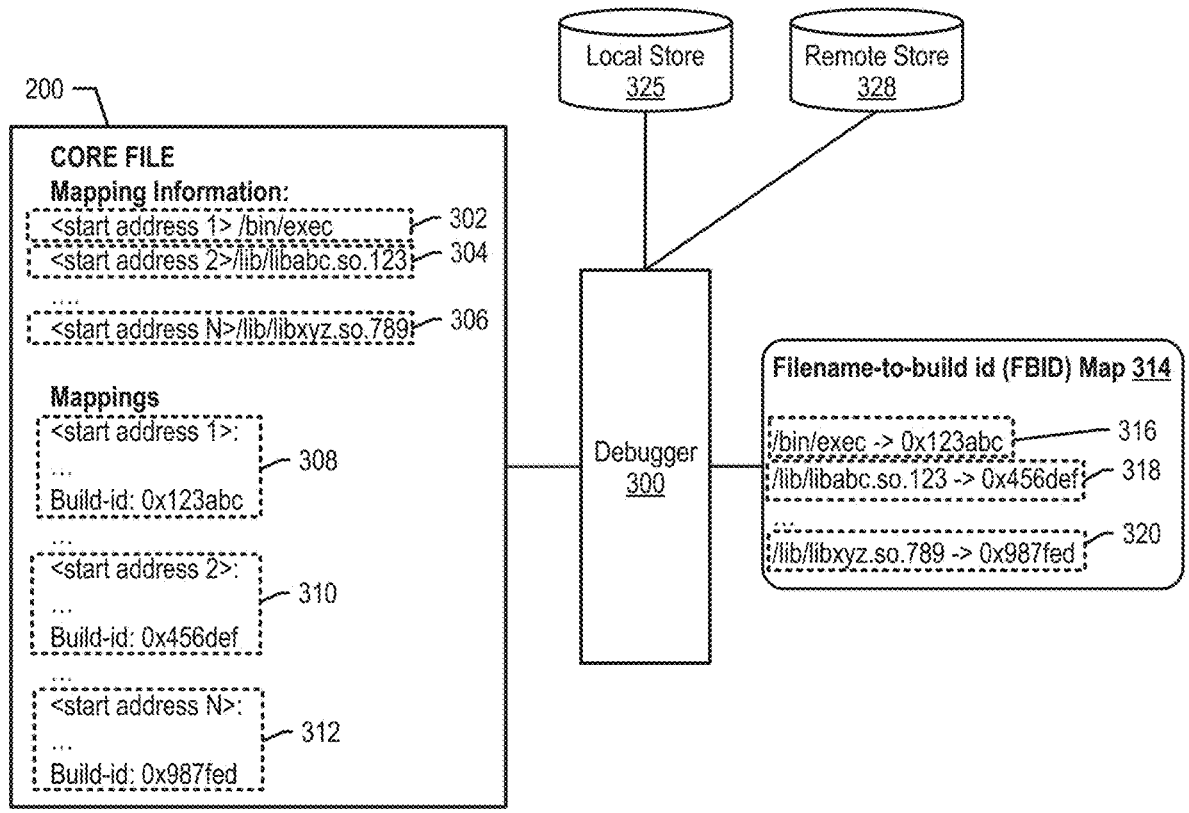
FIGS. 3A and 3B are block diagrams illustrating examples of a debugger generating mappings for that are used to verify that correct versions of files are utilized to analyze a computer program crash event.
Figure 3B:
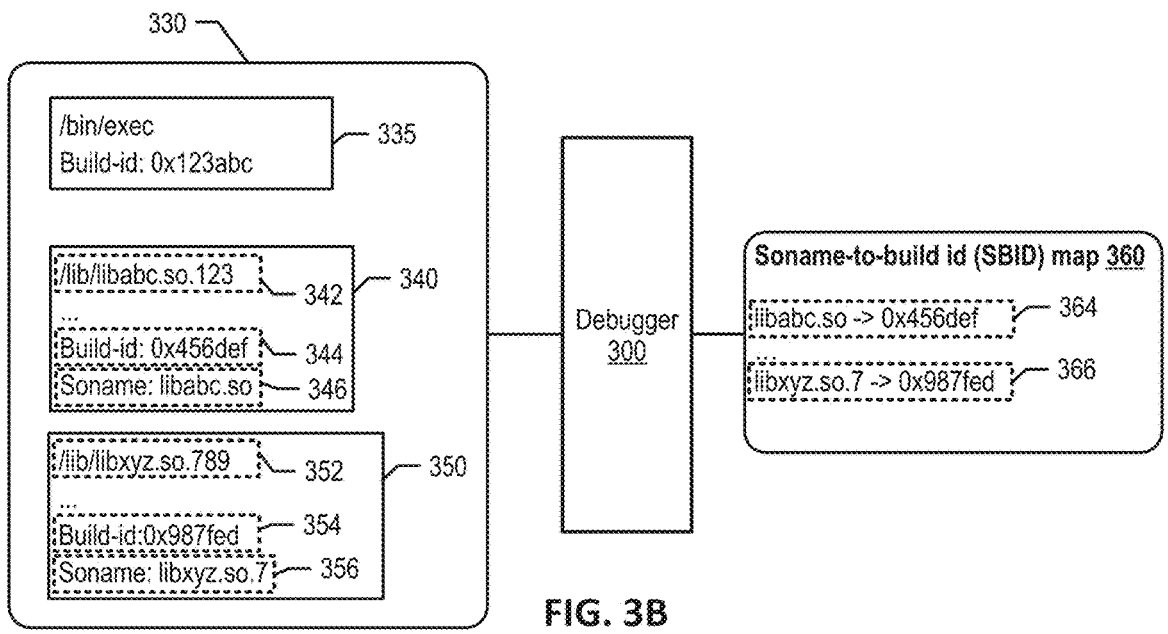

FIGS. 3A and 3B are block diagrams illustrating examples of a debugger generating mappings for that are used to verify that correct versions of files are utilized to analyze a computer program crash event.

Referring to FIG. 3A, debugger 300 uses core file 200 to build a filename to target build ID (FTBID) map 314. Core file 200 includes line 302, which shows that the executable /bin/exec (program that caused the core dump) begins at start address 1 in core file 200. Start address 1 begins at segment 308 and includes target build ID 0x123abc, which is the build ID of the executable file. As such, debugger 300 adds mapping 316 to FTBID map 314 that maps /bin/exec to build ID 0x123abc. Debugger 300 then proceeds through a series of steps discussed herein to locate the correct version of the executable file in local store 325 or remote store 328 by matching the target build ID to a file build ID included in a located file. In one embodiment, when debugger does not locate the correct version of a file in local store 325, debugger 300 uses a query server to automatically search for the file in remote store 328, such as debuginfod. Debuginfod is a file server that serves debugging resources to debugger-like tools. The server periodically scans directory trees and RPM archives to extract the build IDs of any executable and debuginfo files found (see FIG. 5 and corresponding text for further details).

Similarly, lines 304 and 306 show that start addresses 2 and 3 in core file 200 correspond to start address segments of libabc.so.123 and libxyz.so.789, respectively. Debugger 300 locates segment 310 at start address 2, identifies target build ID 0x456def, and adds mapping 318 to FTBID map 314 that maps libabc.so.123 to target build ID 0x456def. Debugger 300 then proceeds through a series of steps discussed herein to locate the correct version of the shared library file in local store 325 or remote store 328 by matching the target build ID to a file build ID included in a located file. In one embodiment, as discussed above, when debugger does not locate the correct version of a file in local store 325, debugger 300 uses a query server to search for the file in remote store 328, such as debuginfod.

Debugger 300 also locates segment 312 at start address 3, identifies target build ID 0x987fed, and adds mapping 320 to FTBID map 314 that maps libxyz.so.789 to target build ID 0x987fed. In turn, in one embodiment, as debugger 300 builds a debug environment, debugger uses FTBID 314 to verify that files loaded into the debug environment are the same versions as the files that were in use at the time of the executable program crash event that created core file 200.

Referring to FIG. 3B, in one embodiment, debugger 300 also builds a soname-to-target build ID (STBID) map 360. A soname (shared object name) is a field of data in a shared object file. The soname is a string, which is used as a "logical name" describing the functionality of the object. Typically, the soname name is equal to the filename of the library, or to a prefix thereof, and the soname is often used to provide version backwards-compatibility information.

During program execution, files may be called by different aliases, such as being called by its filename in some areas and being called by its soname in other areas. As such, as debugger 300 constructs a snapshot, debugger 300 may need to download a file based on its soname and therefore needs to confirm that it is the correct version. To provide this feature, debugger 300 generates STBID map 360 to verify the files based on their soname.

Debugger 300, in one embodiment, uses temporary storage 330 to store files downloaded or found locally. File 335 is the executable file with build ID 0x123abc. File 340 is shared library file libabc.so.123 (line 342) with file build ID 0x456def (line 344). Line 346 shows that the soname of the shared library is libabc.so. As such, debugger 300 adds mapping 364 to STBID map 360 that maps soname libabc.so to file build ID 0x456def. Likewise, file 350 is shared library file libxyz.so.789 (line 352) with file build ID 0x987fed (line 354). Line 356 shows that the soname of the shared library is libxyz.so.7. As such, debugger 300 adds mapping 366 to STBID map 360 that maps soname libxyz.so.7 to file build ID 0x987fed. In turn, when debugger 300 access or downloads files while building a snapshot in the debug environment, debugger 300 verifies each file using the STBID map 360 and/or FTBID map 314.

FIG. 4 is a flow diagram of a method 400 for utilizing correct versions of files to analyze a computer program crash event. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. in some embodiments, the method 400 may be performed by a computing device (e.g., computing device 110 or 150 illustrated in FIGS. 1 and 2).

At block 410, computing device 110 may create a plurality of mappings from a core file comprising a plurality of filenames and a plurality of target build identifiers (IDs). The core file corresponds to a computer program crash event and each one of the plurality of mappings map one of the plurality of filenames to a corresponding one of the plurality of target build IDs.

At block 420, responsive to creating the plurality of mappings, computing device 110 may locate a first file corresponding to a first filename included in a first mapping from the plurality of mappings. The first mapping comprises a first target build ID. At block 430, computing device 110 may utilize the first file to analyze the computer program crash event in response to determining that the first file build ID matches the first target build ID.

Figure 5:
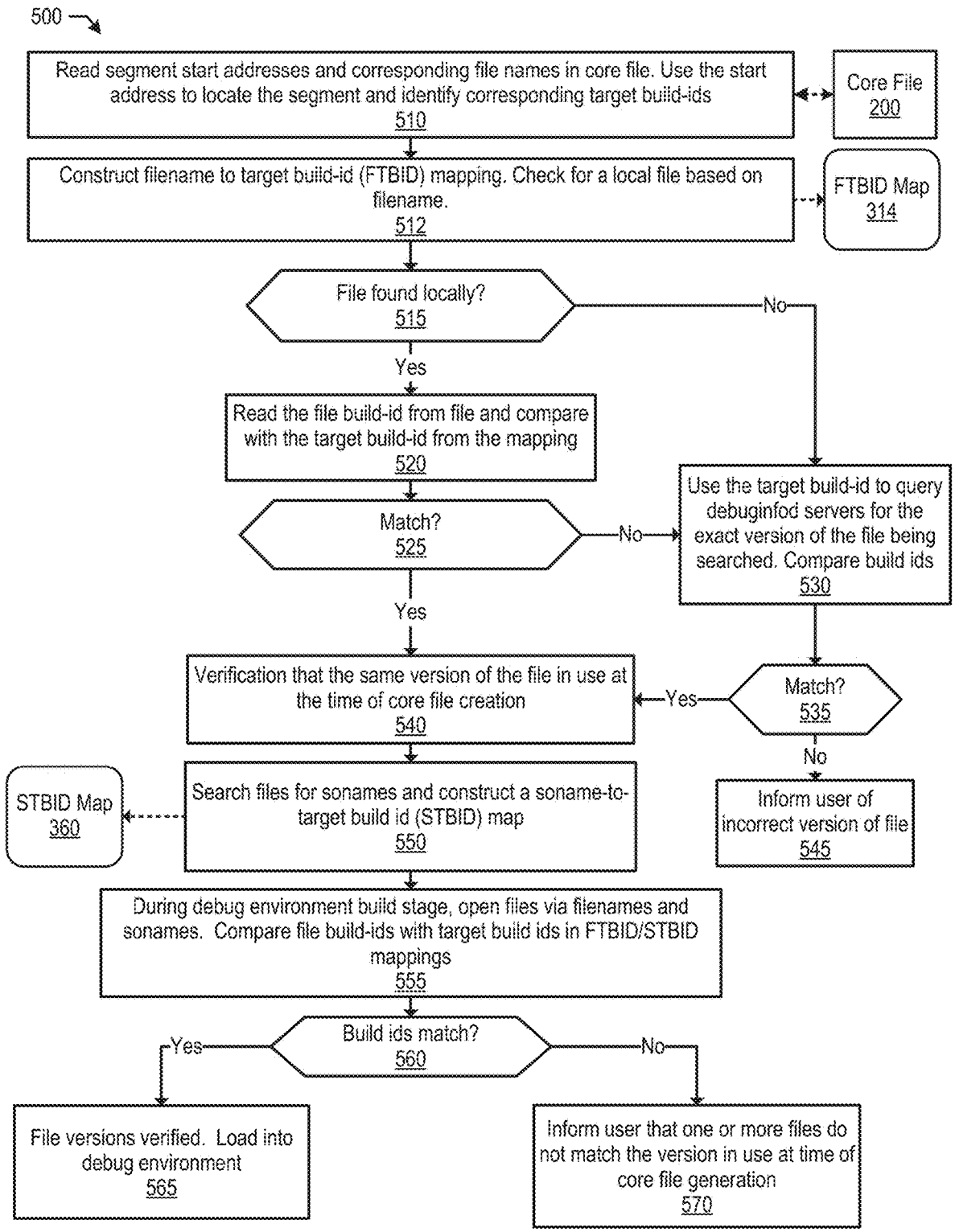
FIG. 5 is a flow diagram of a method showing another embodiment to utilize correct versions of files to analyze a computer program crash event.

In one embodiment, computing device 110 may perform additional steps to automatically locate a correct version of a file as well as verifying that files referenced by soname are the correct version (see FIG. 5 and corresponding text for further details).

FIG. 5 is a flow diagram of a method 500 showing another embodiment to utilize correct versions of files to analyze a computer program crash event. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. in some embodiments, the method 500 may be performed by a computing device (e.g., computing device 110 illustrated in FIGS. 1 and 2).

At block 510, computing device 110 may read segment start addresses and corresponding file names in core file 200 (refer to FIG. 3A and corresponding text for further details). Computing device 110 may use the start addresses to locate the segments also included in core file 200 and identify their corresponding target build-IDs. At block 512, computing device 110 may construct a filename to target build-ID (FTBID) mapping (FTBID map 314). In one embodiment, computing device 100 performs steps in blocks 512 through 540 or 550 on an individual basis for each mapping in FTBID 314.

Computing device 110, for each mapping, may then check for a local file based on the filename (block 512). If computing device 110 locates the file locally, decision 515 branches to the 'yes' branch whereupon, at block 520, computing device 110 may read the file build-ID from the located file and compare the file build ID with the target build-ID in FTBID map 314. If the file build ID matches the target build ID, then decision 525 branches to the 'yes' branch whereupon, at block 540, computing device 110 may verify that the file is the same version that was in use at the time of core file creation.

On the other hand, if the file build ID in the local file does not match the target build ID, then decision 525 branches to the 'no' branch to block 530. Similarly, referring back to decision 515, if computing device 110 does not locate the file locally, then decision 515 branches to the 'no' branch. At block 530, computing device 110 may use the target build-ID to query debuginfod servers for the correct version of the file being searched. In one embodiment, computing device 110 (e.g., debugger 300) automatically performs the step shown in block 530.

When the file is located on a server, computing device 110 may compare the located file build ID to the target build ID and determine as to whether they match (decision 535). If the two build IDs match, then decision 535 branches to the 'yes' branch whereupon, at block 540, computing device 110 may verify that the file is the same version that was in use at the time of core file creation. On the other hand, if the build IDs do not match, then decision 535 branches to the 'no' branch whereupon, at block 545 computing device 110 may inform the user that an incorrect version of the file may be used to build the snapshot in the debug environment.

At block 550, computing device 110 may download the files and search the files for their corresponding sonames. Computing device 110 may then construct a soname-to-build ID (STBID) map 360, which maps the sonames to their corresponding target build IDs. At block 555, in one embodiment, during the debug environment build stage, computing device 110 may open files via filenames and sonames and compare the file build-IDs in the opened files with target build IDs in FTBID 314 or STBID 360.

Computing device 110 may determine, on an individual file-by-file basis, as to whether the file build ID matches the corresponding target build ID (decision 560). If the build IDs match, then decision 560 branches to the 'yes' branch whereupon, at block 565, computing device 110 may verify that the same version of the file was in use at the time of the core file creation and, in one embodiment, load the file into the debug environment in response to determining that the build IDs match. On the other hand, if the build IDs do not match, then decision 560 branches to the 'no' branch whereupon, at block 570, computing device 110 may inform the user that the file does not match the version referenced in the core file.

Figure 6:
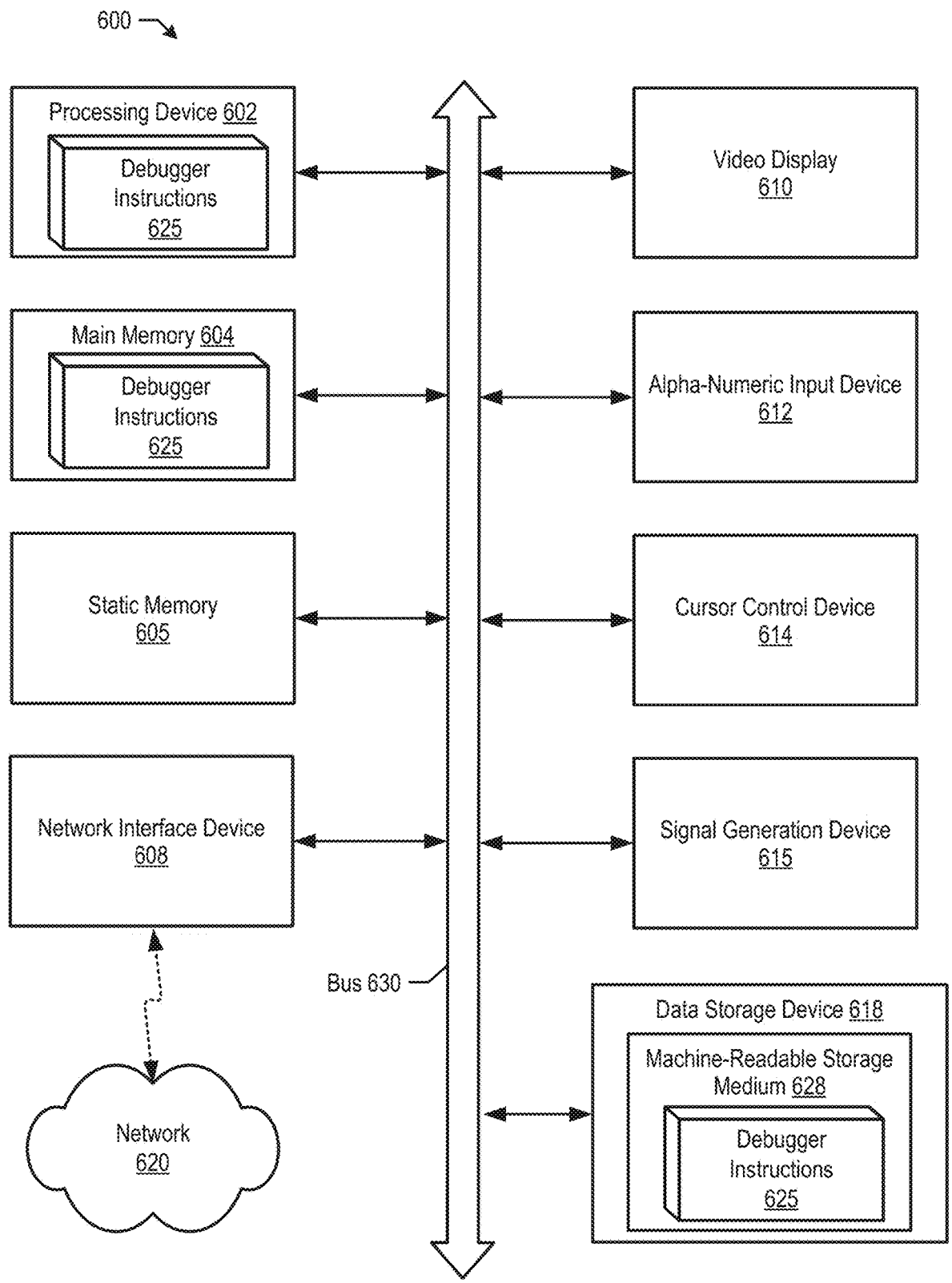
FIG. 6 illustrates a diagrammatic representation of a machine in the example form of a computer system within which a set of instructions, for causing the machine to perform any one or more of the methodologies discussed herein for debug analysis.

FIG. 6 illustrates a diagrammatic representation of a machine in the example form of a computer system 600 within which a set of instructions, for causing the machine to perform any one or more of the methodologies discussed herein for debug analysis.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute debugger instructions 625, for performing the operations and steps discussed herein.

The data storage device 618 may include a machine-readable storage medium 628, on which is stored one or more sets of debugger instructions 625 (e.g., software) embodying any one or more of the methodologies of functions described herein. The debugger instructions 625 may also reside, completely or at least partially, within the main memory 604 or within the processing device 602 during execution thereof by the computer system 600; the main memory 604 and the processing device 602 also constituting machine-readable storage media. The debugger instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   creating a plurality of mappings from a core file comprising a plurality of filenames and a plurality of target build identifiers (IDs), wherein the core file corresponds to a computer program crash event and each one of the plurality of mappings map one of the plurality of filenames to a corresponding one of the plurality of target build IDs;
   building a debug environment responsive to creating the plurality of mappings;
   locating a first file corresponding to a first filename included in a first mapping from the plurality of mappings, wherein the first mapping comprises a first target build ID and the first file comprises a file build ID;
   loading the first file into the debug environment responsive to determining that the first file build ID matches the first target build ID; and
   debugging, by a processing device, the computer program crash event using the first file in the debug environment.

2. The method of claim 1, wherein the plurality of mappings is a plurality of first mappings and, prior to building the debug environment, the method further comprises:
   locating a plurality of files corresponding to the plurality of target build IDs, wherein each file in the plurality of files includes one of a plurality of sonames; and
   creating a plurality of second mappings, wherein each one of the plurality of second mappings map one of the plurality of sonames to a corresponding one of the plurality of target build IDs.

3. The method of claim 2, wherein, during the building of the debug environment, the method further comprises:
   locating a second file, from the plurality of files, that corresponds to a first soname in the plurality of sonames, wherein the second file includes a second file build ID;
   selecting one of the plurality of second mappings that correspond to the first soname, wherein the selected mapping includes a second target build ID; and
   loading the second file into the debug environment in response to determining that the second file build ID matches the second target build ID.

4. The method of claim 1, wherein the first file is located on a first storage area, the method further comprising:
   responsive to the first file build ID not matching the first target build ID, invoking a query to locate a second file on a second storage area;
   responsive to receiving a query response that locates the second file on the second storage area, retrieving the second file from the second storage area, wherein the second file includes a second file build ID; and
   loading the second file into the debug environment in response to determining that the second file build ID matches the first target build ID.

5. The method of claim 4, further comprising:
   responsive to the second file build ID not matching the first target build ID, transmitting a notification message to a user, prior to debugging the computer program crash event, that indicates a correct version corresponding to the target build ID is unavailable.

6. The method of claim 1, wherein the creating of the plurality of mappings further comprises:
   identifying a first section in the core file, wherein the first section comprises a start address and a second filename from the plurality of filenames;
   locating a second section in the core file that begins at the start address, wherein the second section comprises a second target build ID; and
   creating one of the plurality of mappings that include the second filename and the second target build ID.

7. A system comprising:
   a memory; and
   a processing device operatively coupled to the memory, the processing device to:
     create a plurality of mappings from a core file comprising a plurality of filenames and a plurality of target build identifiers (IDs), wherein the core file corresponds to a computer program crash event and each one of the plurality of mappings map one of the plurality of filenames to a corresponding one of the plurality of target build IDs;
build a debug environment responsive to creating the plurality of mappings;
locate a first file corresponding to a first filename included in a first mapping from the plurality of mappings, wherein the first mapping comprises a first target build ID and the first file comprises a file build ID;
load the first file into the debug environment responsive to determining that the first file build ID matches the first target build ID; and
debug the computer program crash event using the first file in the debug environment.

8. The system of claim 7, wherein the plurality of mappings is a plurality of first mappings and, prior to building the debug environment, the processing device is to:
locate a plurality of files corresponding to the plurality of target build IDs, wherein each file in the plurality of files includes one of a plurality of sonames; and
create a plurality of second mappings, wherein each one of the plurality of second mappings map one of the plurality of sonames to a corresponding one of the plurality of target build IDs.

9. The system of claim 8, wherein, during the building of the debug environment, the processing device is to:
locate a second file, from the plurality of files, that corresponds to a first soname in the plurality of sonames, wherein the second file includes a second file build ID;
select one of the plurality of second mappings that correspond to the first soname, wherein the selected mapping includes a second target build ID; and
load the second file into the debug environment in response to determining that the second file build ID matches the second target build ID.

10. The system of claim 7, wherein the first file is located on a first storage area, the processing device is to:
responsive to the first file build ID not matching the first target build ID, invoke a query to locate a second file on a second storage area;
responsive to receiving a query response that locates the second file on the second storage area, retrieve the second file from the second storage area, wherein the second file includes a second file build ID; and
load the second file into the debug environment in response to determining that the second file build ID matches the first target build ID.

11. The system of claim 10, wherein the processing device is to:
responsive to the second file build ID not matching the first target build ID, transmit a notification message to a user, prior to debugging the computer program crash event, that indicates a correct version corresponding to the target build ID is unavailable.

12. The system of claim 7, wherein the processing device is to:
identify a first section in the core file, wherein the first section comprises a start address and a second filename from the plurality of filenames;
locate a second section in the core file that begins at the start address, wherein the second section comprises a second target build ID; and
create one of the plurality of mappings that include the second filename and the second target build ID.

13. A non-transitory computer readable medium, having instructions stored thereon which, when executed by a processing device, cause the processing device to:
create a plurality of mappings from a core file comprising a plurality of filenames and a plurality of target build identifiers (IDs), wherein the core file corresponds to a computer program crash event and each one of the plurality of mappings map one of the plurality of filenames to a corresponding one of the plurality of target build IDs;
build a debug environment responsive to creating the plurality of mappings;
locate a first file corresponding to a first filename included in a first mapping from the plurality of mappings, wherein the first mapping comprises a first target build ID and the first file comprises a file build ID;
load, by the processing device, the first file into the debug environment responsive to determining that the first file build ID matches the first target build ID; and
debug, by the computer program, the computer program crash event using the first file in the debug environment.

14. The non-transitory computer readable medium of claim 13, wherein the plurality of mappings is a plurality of first mappings and, prior to building the debug environment, the processing device is to:
locate a plurality of files corresponding to the plurality of target build IDs, wherein each file in the plurality of files includes one of a plurality of sonames; and
create a plurality of second mappings, wherein each one of the plurality of second mappings map one of the plurality of sonames to a corresponding one of the plurality of target build IDs.

15. The non-transitory computer readable medium of claim 14, wherein, during the building of the debug environment, the processing device is to:
locate a second file, from the plurality of files, that corresponds to a first soname in the plurality of sonames, wherein the second file includes a second file build ID;
select one of the plurality of second mappings that correspond to the first soname, wherein the selected mapping includes a second target build ID; and
load the second file into the debug environment in response to determining that the second file build ID matches the second target build ID.

16. The non-transitory computer readable medium of claim 13, wherein the first file is located on a first storage area, the processing device is to:
responsive to the first file build ID not matching the first target build ID, invoke a query to locate a second file on a second storage area;
responsive to receiving a query response that locates the second file on the second storage area, retrieve the second file from the second storage area, wherein the second file includes a second file build ID;
load the second file into the debug environment in response to determining that the second file build ID matches the first target build ID; and
responsive to the second file build ID not matching the first target build ID, transmit a notification message to a user, prior to debugging the computer program crash event, that indicates a correct version corresponding to the target build ID is unavailable.

17. The non-transitory computer readable medium of claim 13, wherein the processing device is to:
identify a first section in the core file, wherein the first section comprises a start address and a second filename from the plurality of filenames;

locate a second section in the core file that begins at the start address, wherein the second section comprises a second target build ID; and create one of the plurality of mappings that include the second filename and the second target build ID.

\* \* \* \* \*